US008036866B1

(12) United States Patent
Flett et al.

(10) Patent No.: US 8,036,866 A0
(45) Date of Patent: Oct. 11, 2011

(54) CASE-BASED DRILLING KNOWLEDGE MANAGEMENT SYSTEM

(75) Inventors: Alan Nicholas Flett, Aberdeen (GB); Derek H. Sleeman, Aberdeen (GB); Alun D. Preece, Aberdeenshire (GB)

(73) Assignee: Baker Hughes Incorporated, Houston, TX (US)

( * ) Notice: Subject to any disclaimer, the term of this patent is extended or adjusted under 35 U.S.C. 154(b) by 1538 days.

(21) Appl. No.: 09/595,550

(22) Filed: Jun. 16, 2000

(51) Int. Cl.
*G06G 7/48* (2006.01)
(52) U.S. Cl. ......... 703/10; 703/9; 703/2; 702/5; 702/14; 706/45; 706/47; 706/60
(58) Field of Classification Search ................ 703/2, 10, 703/11, 13, 9; 702/5, 14; 706/45, 47, 60
See application file for complete search history.

(56) References Cited

U.S. PATENT DOCUMENTS

| | | | |
|---|---|---|---|
| 4,794,534 A | 12/1988 | Millheim | |
| 4,916,633 A * | 4/1990 | Tychonievich et al. | 706/60 |
| 4,967,368 A * | 10/1990 | Bolling et al. | 706/45 |
| 5,077,677 A * | 12/1991 | Murphy et al. | 706/62 |
| 5,508,915 A | 4/1996 | Tsao et al. | |
| 5,794,720 A | 8/1998 | Smith et al. | |
| 6,487,545 B1 * | 11/2002 | Wical | 706/45 |
| 6,711,529 B1 * | 3/2004 | Thore | 703/10 |

OTHER PUBLICATIONS

Lehnert et al., Explorer: A Natural Language Processing System for Oil Exploration, IEEE 1983.*
Niedzwecki et al., Ocean Drilling Program VII Expert Systems for Deepwater Scientific Drilling Activities, IEEE 1985.*
P. Imrich, Fuzzy Knowledge Base in Evaluation of Drilling, IEEE 1996.*
Sleeman et al., Case-Based Reasoning, Learning and Refinement for Industrial Diagnosis, Feb. 12, 1993, ACM.*
Preece et al., Kraft:Knowledge Fusion from Distributed Databases and Knowledge Bases, IEEE 1997.*
Sleeman et al., Case-Based Planning in an Exploratory Discovery System, IEEE 1997.*
Preece et al., Better Knowledge Management through Knowledge Engineering, IEEE 2001.*
Preece et al., Better Knowledge Management Through Knowledge Engineering: A Case Study in Drilling Optimisation, ACM 2000, also found at www.csd.abdn.ac.uk/~apreece/research/ download/ es2000b.pdf.*

* cited by examiner

*Primary Examiner* — W. Thomson
(74) *Attorney, Agent, or Firm* — Hill & Hunn LLP (57) ABSTRACT

A method has been designed for storing drilling knowledge and experience in a highly structured fashion that permits the user to identify drilling cases that meet user-specified criteria and to retrieve the knowledge and experience relating to those cases. In this way the user is able to retrieve the knowledge and experience learned in cases that are analogous to one or more current cases they are studying.

8 Claims, 3 Drawing Sheets

CASE-BASED DRILLING KNOWLEDGE MANAGEMENT SYSTEM

BACKGROUND OF THE INVENTION

A method has been designed for storing drilling knowledge and experience in a highly structured fashion that permits the user to identify drilling cases that meet user-specified criteria and to retrieve the knowledge and experience relating to those cases. In this way the user is able to retrieve the knowledge and experience learned in cases that are analogous to one or more current cases they are studying.

SUMMARY OF THE INVENTION

The fundamental functionality of the system is to represent drilling experiences in a highly structured fashion, so that the system can then be interrogated by querying for analogous cases. In this way, it supports certain decisions the engineer may make through the application of captured and stored organizational experience. The system's preferred technology for implementing this is a logic-intensive computer system (implemented using a Description Logic called LOOM), which allows for the logical representative of concepts and relationships commonly conceptualized in the drilling domain. These are then organized into a subsumption hierarchy automatically by LOOM; such a set of defined concepts and relationship is called an ontology in the literature. More complex concepts can be built/described using the more base/primitive concepts and relationships, such as a schema for the describing of bit run expectations elicited from field engineers including their decisions. The system can also be used to constrain what is expressible by the field engineer in terms of the case's description, thereby limiting the bounds of his knowledge, and effectively putting extreme best practice limits, on, say, his drill bit selection in certain hardnesses of rocks. The invention claimed is the utilization of a set of concepts and relationships to represent the drilling related knowledge and experience.

DETAILED DESCRIPTION OF THE INVENTION

Figure 1:
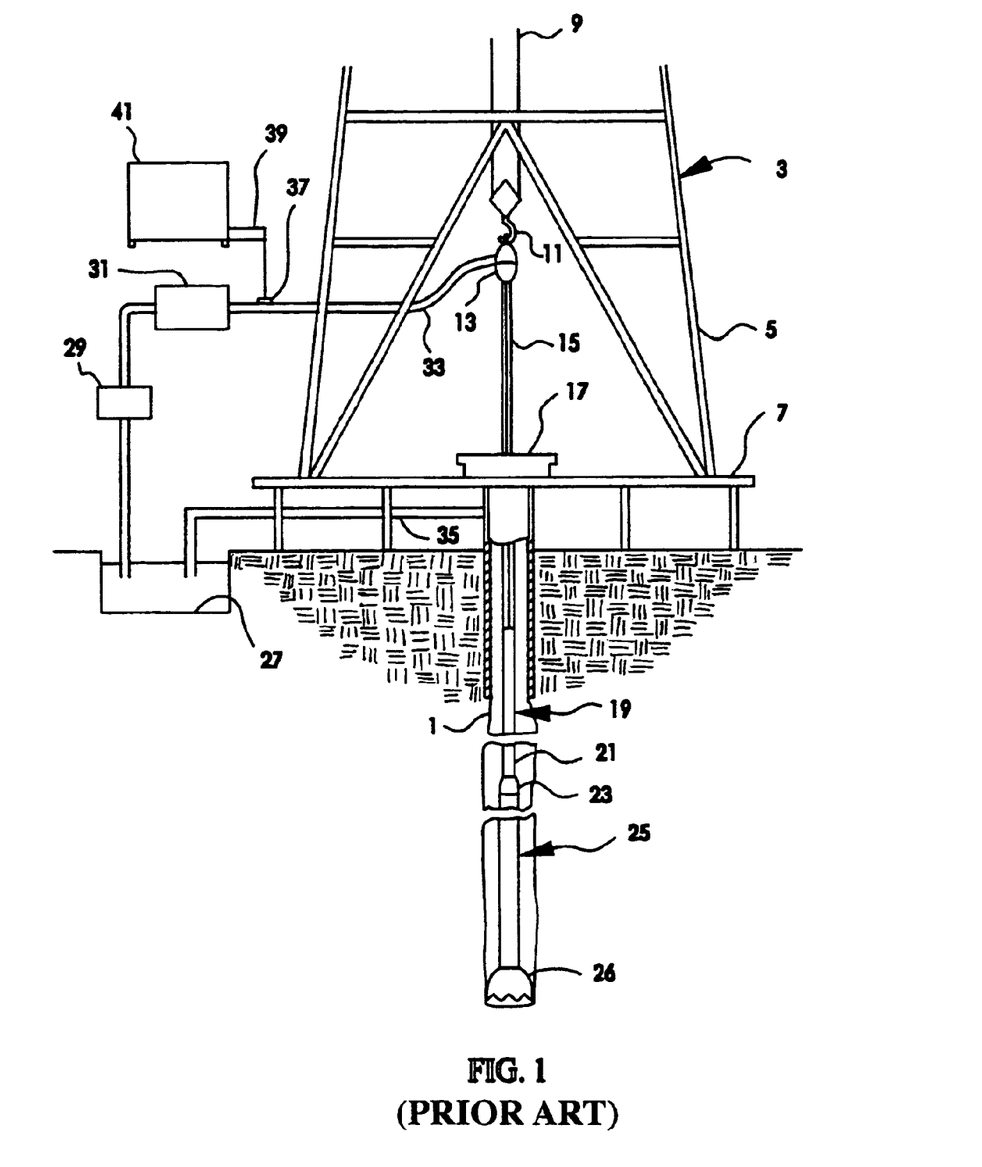
FIG. 1 depicts one example of drilling operations conducted in accordance with the present invention.

OVERVIEW OF DRILLING OPERATIONS: FIG. 1 depicts one example of drilling operations conducted in accordance with the present invention.

As is shown, a conventional rig 3 includes a derrick 5, derrick floor 7, draw works 9, hook 11, swivel 13, kelly joint 15, and rotary table 17. A drillstring 19 which includes drill pipe section 21 and drill collar section 23 extends downward from rig 3 into wellbore 1. Drill collar section 23 preferably includes a number of tubular drill collar members which connect together, including a measurement-while-drilling logging subassembly and cooperating mud pulse telemetry data transmission subassembly, which are collectively referred to hereinafter as "measurement and communication system 25".

During drilling operations, drilling fluid is circulated from mud pit 27 through mud pump 29, through a desurger 31, and through mud supply line 33 into swivel 13. The drilling mud flows through the kelly joint and an axial central bore in the drillstring. Eventually, it exits through jets which are located in downhole drill bit 26 which is connected to the lowermost portion of measurement and communication system 25. The drilling mud flows back up through the annular space between the outer surface of the drillstring and the inner surface of wellbore 1, to be circulated to the surface where it is returned to mud pit 27 through mud return line 35. A shaker screen (which is not shown) separates formation cuttings from the drilling mud before it returns to mud pit 27.

Preferably, measurement and communication system 25 utilizes a mud pulse telemetry technique to communicate data from a downhole location to the surface while drilling operations take place. To receive data at the surface, transducer 37 is provided in communication with mud supply line 33. This transducer generates electrical signals in response to drilling mud pressure variations. These electrical signals are transmitted by a surface conductor 39 to a surface electronic processing system 41, which is preferably a data processing system with a central processing unit for executing program instructions, and for responding to user commands entered through either a keyboard or a graphical pointing device.

The mud pulse telemetry system is provided for communicating data to the surface concerning numerous downhole conditions sensed by well logging transducers or measurement systems that are ordinarily located within measurement and communication system 25. Mud pulses that define the data propagated to the surface are produced by equipment which is located within measurement and communication system 25. Such equipment typically comprises a pressure pulse generator operating under control of electronics contained in an instrument housing to allow drilling mud to vent through an orifice extending through the drill collar wall. Each time the pressure pulse generator causes such venting, a negative pressure pulse is transmitted which can be received by surface transducer 37. An alternative conventional arrangement generates and transmits positive pressure pulses. As is conventional, the circulating mud provides a source of energy for a turbine-driven generator subassembly which is located within measurement and communication system 25. The turbine-driven generator generates electrical power for the pressure pulse generator and for various circuits including those circuits which form the operational components of the measurement-while-drilling tools. As an alternative or supplemental source of electrical power, batteries may be provided, particularly as a back-up for the turbine-driven generator.

OVERVIEW OF THE INVENTION

Figure 2:
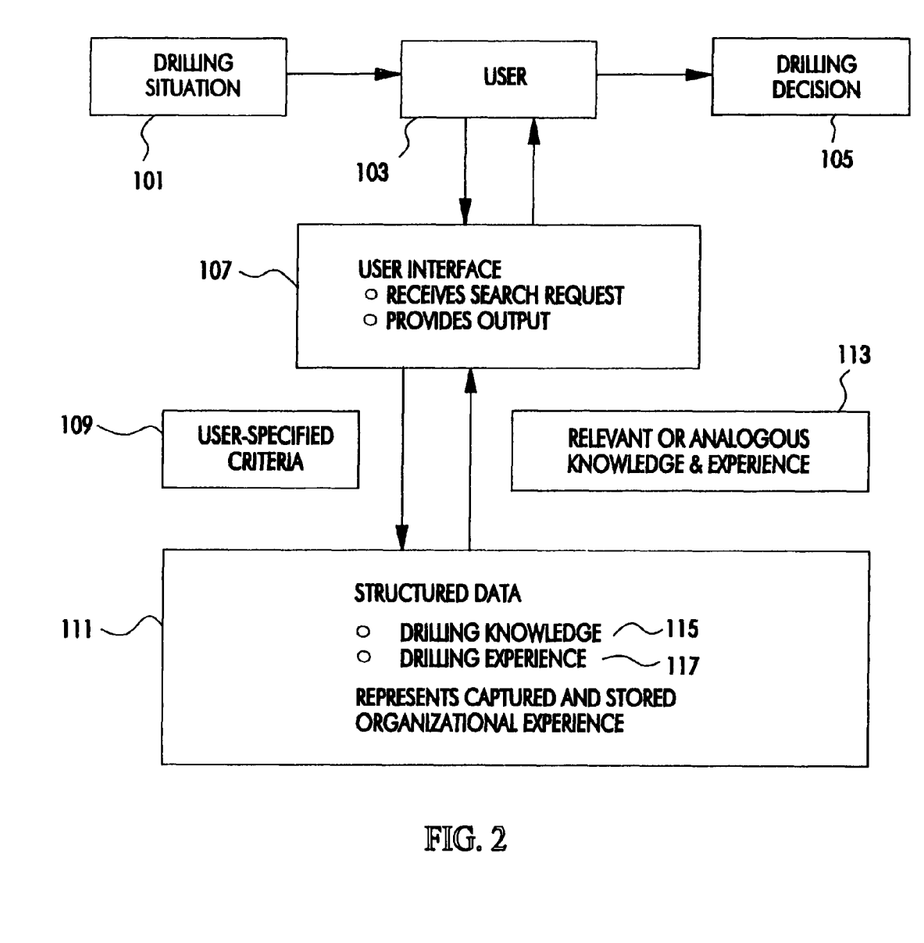
FIG. 2 is a block diagram representative of the preferred embodiment of the present invention.

FIG. 2 is a block diagram representative of the preferred embodiment of the present invention. As is shown, a drilling situation 101 is presented to user 103. User 103 must make a decision concerning the drilling situation. The decision may include determining what types of downhole equipment to utilize, such as a selection of rock bits for particular types of drilling situations. User 103 interacts through user interface 107 with database 111. User interface includes a means for receiving a search request from user 103 and a means for providing an output to user 103 in a human-readable form. In accordance with the preferred embodiment of the present invention, the user generates a query which is defined by user-specified criteria 109 which is passed from user interface 107 to database 111. Database 111 includes structured data which represents captured and stored organizational experience. For example, the structured data may include drilling knowledge 115 and/or drilling experience 117. The user-specified criteria is utilized to query database 111 in a manner which generates as an output the relevant or analogous knowledge and experience resident or present in database 111. This is passed through user interface 107 to user 103. User 103 then may utilize the knowledge to make drilling decision 105.

The user interface 107 and database 111 of FIG. 2 are preferably constructed utilizing executable program instructions. Preferably, the program instructions are executed by a general purpose data processing system, such as that depicted in FIG. 3.

Figure 3:
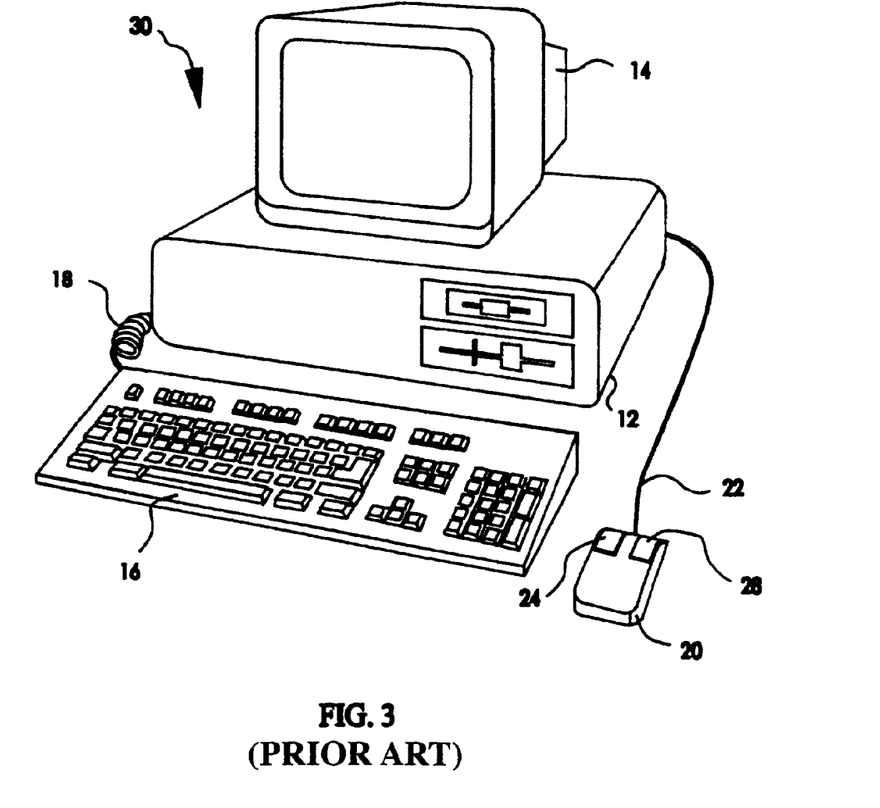
FIG. 3 is a general purpose data processing system according to an embodiment of the invention.

With reference now to the figures and in particular with reference to FIG. 3, there is depicted a pictorial representative of data processing system 41 which may be programmed in accordance with the present invention. As may be seen, data processing system 41 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 41. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 41 may be implemented utilizing a so-called personal computer.

Description of Loom

LOOM is a research project in the Artificial Intelligence Research Group at the University of Southern California's Information Sciences Institute. The goal of the project is to develop and field advanced tools for knowledge representation and reasoning in Artificial Intelligence. LOOM software is the intellectual property of the University of Southern California.

The LOOM software is a language and environment for constructing intelligent applications. At the heart of LOOM is a knowledge representation system used to provide deductive support for a declarative knowledge portion of the LOOM language. Declarative knowledge in LOOM consists of definitions, rules, facts, and default rules. A deductive engine called a classifier utilizes forward-chaining, semantic unification, and object-oriented truth maintenance technologies to compile the declarative knowledge into a network designed to efficiently support on-line deductive query processing.

The LOOM system implements a logic-based pattern matcher for driving a production rule facility, and a pattern-directed method dispatching facility for supporting the definition of object-oriented methods. There is a high degree of integration between LOOM's declarative and procedural components. This permits programmers to utilize logic programming, production rule, and object-oriented programming paradigms in a single application. The LOOM software can also be used as a deductive layer that overlays an ordinary CLOS network. In this mode, users can obtain many of the benefits of using LOOM without impacting the function or performance of their CLOS based applications.

LOOM has been distributed to more than 80 universities and corporations, and is being used in numerous DARPA-sponsored projects in planning, software engineering, and intelligent integration of information.

Licensing of LOOM:

The LOOM software is the intellectual property of the University of Southern California. It is not in the public domain; however, the University of Southern California grants permission to use this software for non-commercial purposes without a fee. If an application is covered by the terms of this fee-free license, it is not necessary to execute a written license agreement. More information about LOOM itself, its availability, and commercial licenses may be obtained from U.S.C. Information Sciences Institute, 4676 Admiralty Way, Marina del Rey, Calif. 90292-6695.

System Requirements:

The LOOM software requires a Common Lisp compiler to function properly. LOOM can be expected to function properly in an ANSI-compliant Common Lisp. LOOM has been tested using the following Common Lisp compilers and platforms: Macintosh Common Lisp version 2.1-4.2; Franz Allegro Common Lisp; Unix (Sparc) versions 4.1-4.3, 5.0; Windows version 4xxx, 5.x (NT); Harlequin LispWorks; Unix (Sparc) version 3.0.2; Windows version 4.0.1 (NT); and Lucid Common Lisp for Unix version 4.1. Although other Lisp systems may work as well, they are not known to have been tested. Newer versions of the lisp systems from these vendors should work. For example, user reports exist which indicate that LOOM works with CMU Common Lisp version 18b.

Source Code:

The LOOM software is distributed as source files which must be compiled using a Common Lisp compiler. Several versions of LOOM are available. Version 4.0 is the current release. The LOOM software is available in several formats, The LOOM 4.0 Source includes installation instructions, and release notes in at least the following files: Unix tar file (3.9 MB), Gzipped Unix tar file (866 kB), and Macintosh binhex file (1.4 MB).

The LOOM 3.0 Source includes installation instructions, and release notes in at least the following files: Unix tar file (3.5 MB), Gzipped Unix tar file (831 kB), and Macintosh binhex file (1.44 MB).

The LOOM 2.1 Source includes installation instructions, and release notes in at least the following files, Unix tar file (3.3 MB) and Gzipped Unix tar file (780 kB).

Documentation, Descriptive Papers, and Manuals:

1. LOOM Reference Manual for LOOM version 2.0, Dave Brill, December 1993. The full paper version is available on-line and in two formats as a postscript file. Note that since the Reference Manual is quite old, the release notes are an important additional source of documentation.

2. Preliminary LOOM Function Card for LOOM version 4.0. A quick summary of LOOM functions, December 1998.

3. LOOM Function Card for LOOM version 2.0. A quick summary of LOOM functions, December 1993. The full paper is available in postscript.

4. Tutorial for LOOM version 2.1. May 1995. The full paper is available in postscript.

5. LOOM User's Guide for LOOM version 1.4. ISX Corporation, August 1991. The full paper is available in postscript.

Additional Information:

From the Intelligent Systems Division of ISI/UCS, Los Angeles, Calif., USA.

1. Useful Loom Reference Material:

The Intelligent Systems Division of Southern California hosts a website (isi.edu/isd) which provides LOOM reference material. Such materials include: Loom Users Guide (more structured description of language), Loom Tutorial (introductory examples and basic concepts), Loom Reference Manual (reference manual of all functions, macros, constructs, grammar, etc.).

2. Ontosaurus: From the Intelligent Systems Division of ISI/ UCS, CA, USA.

The Knowledge Base

There are two main parts to the knowledge base: a conceptual model part, and a database part. This is analogous to a database with its schema and data parts. The conceptual part of the knowledge base is defined using concepts. There are binary concepts (otherwise known as roles or relations) and unary concepts (otherwise known as concepts or classes). A introduction to these ideas in terms of Loom can be found in the Loom reference material.

The existential database part maybe easier to edit. To this end a brief summary is given of what the new instances should look like when being entered. The constructors most easily used in the database part of the knowledge base are "tell" and "about". Tell is used to assert propositions and facts about the world or domain. About references the instance those propositions refer to.

Domain Specific Conceptual Modelling and Case Capture: This is in general how a case is to be entered.

CASE: The instance below is a case instance. It has one formation sequence name and zero or more decisions and/or observations.

```
(tell (:about Case-Name
   CASE
   (formation-sequence Formation-Sequence-Name)
   (decision Decision-Name)
   (observation Observation-Name)))
```

The instance below is that of a formation sequence instance. It was one or more formation names.

```
(tell (:about Formation-Sequence-Name
   FORMATION_SEQUENCE
   (formation Formation-Name)))
```

The instance below is that of a formation. It has one or more lithologies. It can also have start and stop depths and an interval length.

```
(tell (:about Formation-Name
   FORMATION
   (lithology Lithology-Name)
   (formation-interval-length-ft/m NUMBER)))
```

The instance below is a lithology. It has one or more hardness definitions. The one below has a lithology hardness percent number meaning that there is number percent of the lithology with the hardness specified by the hardness instance in the ternary relation. Using the interval length from the formation this lithology is in, the lithology hardness amount in feet or meters can be calculated.

```
(tell (:about Lithology-Name
   LITHOLOGY
   (lithology-hardness-percent   Generic-Hardness-Instance-Name NUMBER)
   (lithology-type-percent NUMBER)))
```

The lithology definitions below has the lithology hardness amount entered directly.

```
(tell (:about Lithology-Name
   LITHOLOGY
   (lithology-hardness-amount-ft/m Generic-Hardness-Instance-Name NUMBER)
   (lithology-type-amount-film NUMBER)))
```

Below is a decision instance. It has goal concepts and issue concepts. It also has an action instance, an author instance, and a reasoning string. (There could be other roles too.)

```
(tell (:about Decision-Name
   DECISION
   (goal GOAL)
   (issue ISSUE)
   (action Action-Name)
   (author Author-Name)
   (authors-reasoning STRING)))
```

Below is a drill bit action instance. It has a drill bit role which is to be filled by a drill bit concept.

```
(tell (:about Action-Name
   ACTION
   (drill-bit DRILL_BIT)))
```

The present invention utilizes an ontological system which employs the LOOM modeling code which is available over the internet from the Information Sciences Institute. LOOM 3.0 is the version that is currently available over the internet. The following is a description of the ontological system, and includes representative code for modeling drilling information.

THE ONTOLOGICAL SYSTEM: The system's main ontological definitions will now be outlined with both a plain English style explanation of the intended meaning and with a copy of the Loom modeling code to reference.

Knowledge Management Concepts

This is one of the main ontological "top level concepts". Top level concepts are those that are of type thing, which is a concept defined in Loom's theory BUILT-IN-THEORY. Any user-defined concept will be of type THING.

```
(defconcept   KNOWLEDGE_MANAGEMENT_CONCEPT)
```

Knowledge management concepts can be broken down into three broad categories including I CASES, II ENVIRONMENT, III DOWNHOLE EQUIPMENT. The following is a description of each of these three categories. The types of information which is modeled in the CASES category includes date, location, decisions, issues, actions, goals, author, author's reasoning, company's reasoning, spin, observation, observation text, observation category, and observation formation. The information which is structured in the environment category includes drilling fluid concepts, rock concepts, formation sequences, single formation sequences, multiple formation sequences, formations, single ontology formations, multiple ontology formations, lithologies, and hardnesses. The types of information organized in the downhole equipment category includes bottomhole assemblies, bottomhole assembly components, and drill bits.

I. Cases

A case is (usually) a bit run case. That is, if some one experienced some bit run worthy of broadcast, then the formation sequence drilled should be represented, as well as the decisions taken on how to drill that formation sequence. That is, there are several decisions which must also be represented. A decision can be a decision about the chosen drill bit, the mud, the BHA, the flow rate, and so on. The case need not be an actual drill bit run if the person entering the case feels that he has some highly structured experience or knowledge he wishes to share. A case also has a date on which it was captured and a location which it is supposed that the case is applicable to. Representative code for case identification follows.

```
(defconcept CASE
    :is-primitive
    (:and (:exactly 1 formation-sequence)
       (:all decision DECISION)
       (:all observation OBSERVATION)))
```

(1) Date: The date is the date on which the bit run or generic knowledge was 'told' to the KB. It consists of at most 1 day, month, and/or year. Representative code follows.

```
(defconcept DATE :is-primitive
    (:and (:at-most 1 day)
       (:at-most 1 month)
       (:at-most 1 year)))
```

(2) Location: The location is the geographical position at which the bit run or knowledge is believed to be applicable to or came from. Representative code follows.
(defconcept LOCATION)

(3) Decisions: A decision here is presupposed to have several different dimensions. These include: issues, actions, goals, an author, a spin, and a reasoning. These dimensions, it is felt, provide a good balance between structure and text. The structure is to enable the formal representative and therefore search power required, and the textual for the more free flowing and readable information.

These decisions are parameter led in that you should only really have a decision object if you came to some decision about a parameter which is possible to modify in the real world and which was indeed modified with reference to some consideration (issue and goal). A parameter can be a drill bit, the flow rate, the BHA used, etc. Representative code follows.

```
(defconcept DECISION
    :is-primitive
    (:and (:exactly 1 action)
       (:at-most 10 issue)
       (:at-most 10 goal)
       (:at-most 1 authors-reasoning)
       (:at-most 1 companys-reasoning)
       (:at-most 1 author)
       (:at-most 1 spin)))
```

(4) Issues: An issue is some observation or issue that the engineer was aware of when making his decision. The issues in the current version reflect quite strongly the Best Practice Drilling database, and the link roles shown below are intended to reflect this. These could be filled with links to other media, indeed to the Notes database itself through URLs. Representative code follows.

```
(defconcept ISSUE
    :is-primitive
    (:and KNOWLEDGE_MANAGEMENT_CONCEPT
       (:at-most 1 symptoms-and-diagnosis-link)
       (:at-most 1 description-link)
       (:at-most 1 parameters-link)
       (:at-most 1 diagnostic-information-link)
       (:at-most 1 planning-actions-link)
       (:at-most 1 operating-practices-link)
       (:at-most 1 examples-link)))
```

(5) Actions: An action is the real-world consequent the engineer performed as part of his decision. Representative code follows.

```
(defconcept ACTION
    :is-primitive
    (:and KNOWLEDGE_MANAGEMENT_CONCEPT
       (:at-most 1 categorical-outcome)
       (:at-most 1 textual-outcome)))
```

(6) Goals: A goal is an objective which the engineer was aiming to achieve with that decision in particular. Representative code follows.

```
(defconcept GOAL
    " "
    :is-primitive
    (:and KNOWLEDGE_MANAGEMENT_CONCEPT))
```

(7) Author: The author is the name of the person telling the decision to the KB. This is part of the decision and not the case as there may be a team involved, with different experts taking different decisions, or there may be multiple experts involved in the one decision. Representative code follows.

```
(defconcept AUTHOR :is-primitive
    (:and (:exactly 1 first-name)
       (:exactly 1 last-name)))
```

(8) Author's Reasoning: Reasoning is a field of free-text for explanations for example of why a certain drill bit was chosen. This is to allow the possibility of incomplete, inaccurate, and even incoherent explanations for actions being stored; after all, the main reasoning or determinism for the action is the other structured information describing the circumstances in which the action was taken, such as the formation sequence. Representative code follows.

```
(defrelation authors-reasoning
    :domain DECISION
    :range STRING
    :characteristics (:closed-world :single-world))
```

(9) Company's Reasoning: This is to allow a field which expresses the company's commonly agreed upon beliefs for the decision in question. Representative code follows.

```
(defrelation companys-reasoning
    :domain DECISION
    :range STRING
    :characteristics (:closed-world :single-world))
```

(10) Spin: The 'spin' is the type of the knowledge captured in terms of whether it is positive or negative in its effect. That is, if a case is entered which in effect is guiding the user to not using the action used in that example, then that should be considered a type of negative knowledge. If, on the other hand, a case has as its effect an engineer retrieving a case and executing the same or similar action, then that case should be considered positive. Representative code follows.

```
(defrelation spin
    :domain DECISION
    :range SPIN
    :characteristics (:closed-world :single-world))
(defset SPIN
    :is-primitive
    (:and KNOWLEDGE_MANAGEMENT_CONCEPT
       (:one-of 'Positive 'Negative)))
```

(11) Observations: An observation is some state or behavior observed in the drilling process. The concept has the three roles of textual-observation, categorical-observation, and observation formation. The last of these relations allows the user to specify more accurately where the observation is valid. Observations should be left to the sort of knowledge exemplified by "ROP dips going through the sand stringers lower down in this bit run", etc. Representative code follows.

```
(defconcept OBSERVATION
    " "
    :is-primitive
    (:and KNOWLEDGE_MANAGEMENT_CONCEPT
       (:at-most 1 observation-formation)
       (:at-most 1 textual-observation)
       (:at-most 1 categorical-observation)))
```

(12) Observation Text: A free text field left for the user to explain himself in plain English. Representative code follows.

(13) Observation Category: This is a concept hierarchy of observations which help to narrow for the purposes of search the context, subject, and object, amongst other things, of the free text.

(14) Observation Formation: This is to allow the user to more accurately contextualize his observation.

II. Environment

The environment here is described in terms of conceptual rock sequences. These sequences have some ontological constraints on them. For instance, if the user wishes to specify the depth and/or length of a particular section of lithology then that section has to be represented as a formation.

The super-structure larger than that is the formation sequence, which can have one or more formations. Each formation can have one or more lithology. A lithology has no depth or length roles.

(1) Drilling Fluid Concepts: This is a concept representing the muds used in drilling oil wells. This is a top level concept in the ontology. Representative code follows.

(defconcept DRILLING_FLUID_CONCEPT)

(2) Rock Concepts: This is a top level concept representing all rock-related concepts, including lithologies, formations, and formation sequences. Representative code follows.

(defconcept ROCK_CONCEPT)

(3) Formation Sequences: A formation sequence is the constructor used to assemble all of the separate sub-sequences identified by the user when describing their well. The formation sequence will usually be the section the drill bit drilled in its run. A formation sequence has one or more constituent formations. Representative code follows.

```
(defconcept FORMATION_SEQUENCE
    :is-primitive
    (:and ROCK_CONCEPT
        (:at-least 1 formation)))
```

(4) Single Formation Formation Sequences: This is a formation sequence with only the single constituent formation. Representative code follows.

```
(defconcept SINGLE_FORMATION_FORMATION_
    SEQUENCE
    :is
    (:and FORMATION_SEQUENCE
        (:exactly 1 formation)))
```

(5) Multiple Formation Formation Sequences: This is a formation sequence with at least two constituent formations. Representative code follows.

```
(defconcept MULTIPLE_FORMATION_FORMATION_
    SEQUENCE
    :is
    (:and FORMATION_SEQUENCE
        (:at-Ieast 2 tormatlonjj))
```

(6) Formations: A formation has one or more lithologies. A formation is the conceptual modeling granularity at which the user should be representing any part of his well he feels should have represented interval lengths and depths. Even stringers, or production sands, if these, it is felt, need to have depths and/or lengths attached to their storage, would need to be modeled as 'formations'. If however, it is only stringers in a majority lithology, which have unimportant positions of depth in the over-all sequence due to uncertainty or irrelevance, then these stringers are 'lithologies' and the overall stringer and majority lithology sequence is then the 'formation'. Representative code follows.

```
(defconcept FORMATION
    :is-primitive
    (:and ROCK_CONCEPT
        (:at-Ieast 1 lithology)))
```

The relation comes-in-somewhere-after relates two formations, the first of which comes in somewhere after the other. Representative code follows.

```
(defrelation comes-in-somewhere-after
    :domain FORMATION_SEQUENCE
    :range FORMATION
    :characteristics (:multiple-valued :closed-world)
    :is (:satisfies (?formation-x ?formation-y)
        (:and
            (FORMATION ?formation-x)
            (FORMATION ?formation-y)
            (:or (comes-in-immediately-after ?formation-x ?formation-y)
                (:exists (?formation-z)
                    (:and
                        (FORMATION ?formation-z)
                        (comes-in-somewhere-after ?formation-x ?formation-z)
                        (comes-in-somewhere-after ?formation-z ?formation-
                        y)))))))
```

The relation comes-in-somewhere-before relates two formations, the first of which comes in somewhere before the other. Representative code follows.

```
(defrelation comes-in-somewhere-before
    :domain FORMATION_SEQUENCE
    :range FORMATION
    :characteristics (:closed-world :multiple-valued)
    :is (:satisfies (?formation-x ?formation-y)
        (:and
            (FORMATION ?formation-x)
            (FORMATION ?formation-y)
            (:or (comes-in-immediately-before ?formation-x ?formation-
y)
                (:exists (?formation-z)
                    (:and
                        (FORMATION ?formation-z)
                        (comes-in-somewhere-before ?formation-x ?formation-z)
                        (comes-in-somewhere-before ?formation-z ?formation-
                        y)))))))
```

The relation comes-in-immediately-after relates two formations, the first of which comes in immediately after the other. Representative code follows.

```
(defrelation comes-in-immediately-after
    :domain FORMATION_SEQUENCE
    :range FORMATION
    :characteristics (:closed-world :single-valued))
```

The relation comes-in-immediately-before relates two formations, the first of which comes in immediately before the other. Representative code follows.

```
(defrelation comes-in-immediately-before
    :domain FORMATION_SEQUENCE
    :range FORMATION
    :characteristics (:closed-world :single-valued))
```

(7) Single Lithology Formations: These are formations conceptualized to have only the single lithology type present (although it may have multiple harnesses). Representative code follows.

```
(defconcept SINGLE_LITHOLOGY_FORMATION
    :is
    (:and FORMATION
        (:exactly 1 lithology)))
```

(8) Multiple Lithology Formations: These are formations conceptualized to have multiple lithology types present (each of which may have multiple harnesses). Representative code follows.

```
(defconcept MULTIPLE_LITHOLOGY_FORMATION
    :is
    (:and FORMATION
        (:at-least 2 lithology)))
```

(9) Lithologies: A lithology is the basic rock type, e.g., sand, shale, etc. Each lithology type also has an amount or a percentage amount for the formation in which it is present. As well as this, each lithology type is broken down into having a hardness, which then itself has an amount or a percentage amount for the lithology type. In this way, complex conceptual descriptions can be built up of the well's statistical hardness profile. It can be envisaged that a tool useful in the construction of such conceptual description could be useful; as different levels of accuracy are obtainable, from the very coarse, to the very fine, grained and, obviously, the more fine grained, the more work is required to enter the definitions. Representative code follows.

```
(defconcept LITHOLOGY
    :is-primitive
    (:and
        ROCK_CONCEPT))
```

(10) Hardnesses: There are various hardness concepts, each with their meaning specified by their UCS ranges. At the top level there is HARDNESS. Below that there are six second tier sub-categories of hardness starting at 0kPSI, and increasing in steps of 5 kPSI. There are also finer grained hardness sub-categories below each second tier category. These start at 0 kPSI and increase in steps of 2.5 kPSI. Each of the six second tier hardness categories has a LOWER_and an UPPER_third tier sub-category. This gives twelve third-tier hardness categories.

An interesting note to be made about harnesses is the following. If there is known to be 60% hard shale and 40% firm shale then that shale can be modeled with those stated percentages. If, however, it is only known that the shale has firm and hard harnesses in it, then a hardness FIRM_TO_HARD could be used as its hardness category (of which there is obviously 100% of). This modelling trick is useful when the exact percentage breakdown of the various constituent harnesses is unavailable. Representative code follows.

```
(defconcept HARDNESS
    :is-primitive
    (:and ROCK_CONCEPT
        (:at-most 1 ucs)))
```

Due to the fact that a lithology may have one type (e.g., it is shale), they can have more than one hardness (e.g., that shale may have 100 m of very soft rock with 300 m soft rock also). Representative code follows.

```
(defrelation hardness
    :domain LITHOLOGY
    :range HARDNESS
    :characteristics (:closed-world :multiple-valued))
```

The following relation calculates the amount of lithology in feet of a certain hardness. It relates the amount, the hardness and the lithology in a ternary relation.

```
(defrelation lithology-hardness-amount-ft
    :arity 3
    :domains (LITHOLOGY HARDNESS)
    :range NUMBER
    :characteristics (:closed-world :single-valued)
    :is (:satisfies (?lithology ?hardness ?hardness-amount-ft)
        (:exists (?percent ?amount)
            (:and (lithology-hardness-percent ?lithology ?hardness ?percent)
                (lithology-type-amount-ft ?lithology ?amount)
                (* (/ ?percent 100.0)?amount ?hardness-amount-ft)))))
```

The following relation calculates the amount of lithology in meters of a certain hardness. It relates the amount, the hardness and the lithology in a ternary relation.

```
(defrelation lithology-hardness-amount-m
    :arity3
    :domains(LITHOLOGY HARDNESS)
    :range NUMBER
    :characteristics (:closed-world :single-valued)
    :is (:satisfies (?lithology ?hardness ?hardness-amount-m)
        (:exists (?percent ?amount)
            (:and (lithology-hardness-percent ?lithology ?hardness ?percent)
                (lithology-type-amount-m ?lithology ?amount)
                (* (/ ?percent 100.0)?amount ?hardness-amount-m)))))
```

The following relation calculates the amount of lithology in a formation in feet.

```
(defrelation lithology-type-amount-ft
    :domain LITHOLOGY
    :rangeNUMBER
    :characteristics (:closed-world :single-valued)
    :is (:satisfies (?lithology ?amount-ft)
        (:exists (?percent ?formation ?length-ft)
            (:and (lithology ?formation ?lithology)
                (formation-interval-length-ft ?formation ?length-ft)
                (lithology-type-percent ?lithology ?percent)
                (* (/ ?percent 100.0)?length-ft ?amount-ft)))))
```

The following relation calculates the amount of lithology in a formation in meters.

```
(defrelation lithology-type-amount-m
    :domain LITHOLOGY
    :rangeNUMBER
    :characteristics (:closed-world :single-valued)
    :is (:satisfies (?lithology ?amount-m)
        (:exists (?percent ?formation ?length-m)
            (:and (lithology ?formation ?lithology)
                (formation-interval-length-m ?formation ?length-m)
                (lithology-type-percent ?lithology ?percent)
                (* (/ ?percent 100.0) ?length-m ?amount-m)))))
```

The following concept is an example of one of the second tier hardness concepts. It will have two subconcepts, upper soft and lower soft, beneath it. It is defined in terms of its ucs range. It is also defined in that it is not primitive, and as such will recognize any hardness instance with its ucs range.

```
(defconcept SOFT
    :is
    (:and HARDNESS
        (>=ucs 5000)
        (<ucs 10000)))
```

III. Down-Hole Equipment

A down-hole tool is here defined to be anything that goes down hole and is not part of a recycling system (such as the fluid). So, a down-hole tool is a drill bit, a BHA component, and so on. Down-hole equipment concept is a top level concept.
(defconcept DOWN-HOLE_EQUIPMENT_CONCEPT)
  (1) Bottom Hole Assemblies: Bottom hole assemblies have at least 1 bha component. Representative code follows.
    (defconcept BOTTOM_HOLE_ASSEMBLY
      :is-primitive
      (:and DOWN-HOLE_EQUIPMENT_CONCEPT
      (:at-least 1 bha-component)))
  (2) BHA Components: A BHA component is anything capable of being added to the BHA. So, motors, bits, MWD, VSS, under-reamers, etc, are all considered BHA_COMPONENTS. Representative code follows.
    (defconcept BHA_COMPONENT
      :is-primitive
      (:and DOWN-HOLE_EQUIPMENT_CONCEPT))
  (3) Drill Bits: A drill bit is a type of down-hole equipment concept with exactly 1 bit gauge. Representative code follows.
    (defconcept DRILL_BIT :is-primitive
      (:and DOWN-HOLE_EQUIPMENT_CONCEPT
      (:exactly 1 bit-gauge)))

Following is a description of how one interacts with the database utilizing the LOOM artificial intelligence system. Representative code is included where necessary to explain the concepts.

How to Interact with the System

I. Querying Instances

The functions retrieve and ask provide the interface to Loom's deductive query facility. Retrieve is used for retrieving facts (instances from a knowledge base), while ask is used to determine whether or not a proposition is true with respect to the currently stated rules and facts.

A query has one of the following forms
  (retrieve ?m1 query)
  (retrieve (?m1 ... ?mn)
  (ask query)
The ?$m_n$ are called output variables, and query is an open sentence in which the output variables appear unbound (unquantified). Query can be any arbitrary expression in the first order predicate calculus (FOPC). The output variables must be prefixed with the character '?'.

As a note of interest, when querying for instances, the full benefits of the subsumption relation comes free. That is, if you have an instance of a drill bit called My-STR20 which is asserted (or deduced) to be of type STR20 (a type of TRICONE), when you come to look for cases with drill bits which are of type TRICONE, My-STR20 will be recognized as such by Loom's nominal query behavior. However, if a case's drill bit has been, like it is here, represented as a concept, then if you enter the query looking for cases with a drill bit of type TRICONE, Loom will, unless forced, not check the conceptual subsumption relation. Hence, to search in a more powerful manner, the function subrelations must be used, which will force Loom to check for subrelation (including subconcept) relations.

II. Examples Queries

Beginning with basic queries, a more complex query will be built.
  (1) Querying Formation Sequences: This is probably the most sophisticated form of querying that will be done of the knowledge base. The two concepts likely to be of interest are formation sequences and formations (which are components of formation sequences). This is due to the more complex ternary relations used in the modelling of the lithologies (which are components of formations). It is also due to the ambiguity that will arise when users split up (or 'conceptualize') their wells into different formations (whilst, maybe, talking about essentially the same formation sequence) using different criteria. If that happens, then the user will want to look for formation sequences that, as a whole, contain, for example, 300 meters and over of very soft to soft shale type lithology. This therefore involves summing the amounts of very soft-to soft shales over all the formations constituent to each formation sequence. Hence the requirement for the sum and count functions below. Also, the query works over all sub-types of shale (e.g., balling shale). It also works over all sub-types of either soft or very soft (e.g., lower very soft). So, the lithology defined as lower very soft balling shale would also have its amount added (as per the query below) to the variable ?lithology-amount-ft.

There are several different flavors to querying formation sequences. You can query for an overall cumulative amount of a certain hardness of a certain lithology over all the formations of a formation sequence.

You can query for formations which have amounts of certain lithologies of certain hardness. The query below queries for cases which have a formation sequence which has as its constituents of its formation(s) greater than or equal to 1900 feet of very soft to soft (including all subtypes of soft and very soft) of shale (including all sub-types of shale). Representative code follows.

```
(retrieve ?case
  (:and
  (CASE ?case)
  (>= (sum (:collect ?lithology-amount-ft
    (:and
    (:exists (?formation-sequence ?formation ?lithology ?hardness)
      (:and
      (formation-sequence ?case ?formation-sequence)
      (formation ?formation-sequence ?formation)
      (lithology ?formation ?lithology)
      (lithology-hardness-amount-ft ?lithology ?hardness ?
        lithology amount-ft)
      (:or
      (VERY_SOFT ?hardness)
      (SOFT ?hardness))
      (SHALE ?lithology)
    1900)))))))
```

2. Querying Authors, Dates, and Locations: The query below queries for cases that have Scott MacDonald as author, of 1998, and in the Gulf of Mexico area. Representative code follows.
```
(retrieve ?case
  (:and
  (CASE ?case)
  (:exists (?decision ?date ?year ?author ?location)
    (:and
    (date ?case ?date)
    (year ?date ?year)
    (=?year 1998)
    (decision ?case ?decision)
    (author ?decision ?author)
    (=?author Scott-MacDonald)
    (location ?case ?location)
    (=?location GOM)))))
```

3. Querying Goals: The query below queries for cases that have a drill bit decision such that one of its goals was for good ROP with good bit cleaning. Representative code follows.

```
(retrieve ?case
    (:and
    (CASE ?case)
    (:exists (?decision)
        (decision ?case ?decision)
        (DRILL_BIT_PLANNING_DECISION ?decision)
        (goal ?decision GOOD_ROP_WITH_GOOD_BIT_
            CLEANING))))
```

4. Querying Actions: The query below queries for cases where the drill bit (planning) action was to use a drill bit of type steel-tooth. This query will work if the drill-bit role has been filled with a concept. The second query will work if the role drill bit has been filled by an instance of a drill bit. For the querying of other actions, goals, and issues, the first type of querying would be used, as all their respective roles have their fillers in instances (of cases) represented as concepts. Representative code follows.

```
(retrieve ?case
    (:and
    (CASE ?case)
    (:exists (?decision ?action ?bit)
        (:and
        (decision ?case ?decision)
        (DRILL_BIT_PLANNING_DECISION ?decision)
        (action ?decision ?action)
        (DRILL_BIT_PLANNING_ACTION ?action)
        (drill-bit ?action ?bit)
        (subrelations STEEL-TOOTH_DRILL_BIT ?bit)))))
(retrieve ?case
    (:and
    (CASE ?case)
    (:exists (?decision ?action ?bit)
        (:and
        (decision ?case ?decision)
        (DRILL_BIT_PLANNING_DECISION ?decision)
        (action ?decision ?action)
        (DRILL_BIT_PLANNING_ACTION ?action)
        (drill-bit ?action ?bit)
        (STEEL-TOOTH_DRILL_BIT ?bit)))))
```

5. Complex Querying: The query below is an example of how many smaller queries can be stuck together to generate more complex queries. Particular note should be taken of the many individual :exists calls with their attendant parameters lists. Representative code follows.

The complex query below queries for cases that have more than or equal to 1900 feet of soft to very soft shale (as above), which had as a goal of the drill bit decision good ROP with good bit cleaning (as above), which also were recorded in 1998 in the Gulf of Mexico by Scott MacDonald (as above), and that the drill bit chosen should be some type of steel tooth drill bit.

```
(retrieve ?case
    (:and
    (CASE ?case)
    10 (>=(sum (:collect ?lithology-amount-ft
        (:and
        (:exists (?formation-sequence ?formation ?lithology ?hardness)
            (:and
            (formation-sequence ?case ?formation-sequence)
            (formation ?formation-sequence ?formation)
            (lithology ?formation ?lithology)
            (lithology-hardness-amount-ft ?lithology ?hardness
            ?lithology-amount-ft)
            (:or
            (VERY_SOFT ?hardness)
            (SOFT ?hardness))
            (SHALE ?lithology)
        1900) )))))
    (:exists (?decision ?date ?year ?author ?location)
        (:and
        (date ?case ?date)
        (year ?date ?year)
        (= ?year 1998)
        (decision ?case ?decision)
        (author ?decision ?author)
        (= ?author Scott-MacDonald)
        (location ?case ?location)
        (= ?location GOM)))
    (:exists (?decision ?issue)
        (:and
        (decision ?case ?decision)
        (issue ?decision ?issue)
        (subrelations ?issue GOOD_ROP_WITH_GOOD_BIT_CLEANING)
        (author ?decision Scott-MacDonald)))
    (:exists (?decision ?action ?drill-bit)
        (decision ?case ?decision)
        (DRILL_BIT_PLANNING_DECISION ?decision)
        (action ?decision ?action)
        (DRILL_BIT_PLANNING_ACTION ?action)
        (drill-bit ?action ?drill-bit)
        (subrelations STEEL-TOOTH_DRILL_BIT ?drill-bit))))
```

What is claimed is:

1. A method of drilling a wellbore, comprising:
   obtaining raw drilling data and information which collectively represents captured and stored organizational drilling experience including drilling knowledge and drilling experience;
   providing an ontology of defined concepts and relationships which relate to and describe drilling operations;
   organizing said raw drilling data and information into a database in accordance with said ontology and in a data processing format;
   providing an interface constructed of data processing instructions in a data processing format for receiving operator queries based upon user-specified criteria and for relevant or analogous knowledge or experience as an output in a human-readable format;
   loading said database and said interface into at least one data processing system;
   receiving at least one user query relating to a particular drilling situation and in user-specified criteria;
   utilizing said at least one data processing system to retrieve from said database relevant or analogous drilling knowledge or experience utilizing said ontology and said user-specified criteria;
   utilizing said interface to provide said relevant or analogous drilling knowledge or experience to an operator;
   utilizing said relevant or analogous drilling knowledge or experience to make drilling decisions during drilling operations.

2. A method of drilling a wellbore, according to claim 1, wherein said ontology is a descriptive logic.

3. A method of drilling a wellbore, according to claim 1, wherein said ontology is composed of a plurality of base concepts and base relationships which may be combined to construct more complex concepts and complex relationships.

4. A method of drilling a wellbore, according to claim 1, wherein said raw drilling information is organized in a subsumption hierarchy.

5. A method of drilling a wellbore, according to claim 1, wherein said raw drilling information is organized in accordance with at least the following concept categories:
- historical experience;
- wellbore environment factors; and
- downhole equipment.

6. A method of drilling a wellbore, according to claim 5, wherein said historical experience includes a plurality of factors which describe a particular historical drilling situation and associated outcome.

7. A method of drilling a wellbore, according to claim 5, wherein said wellbore environment factors include at least one of the following factors:
- drilling fluid properties;
- rock properties; and
- formation attributes.

8. A method of drilling a wellbore, according to claim 5, wherein said down hole equipment category includes at least one of the following items:
- bottomhole assembly components; and
- drill bit components.

* * * * *